US008674526B2

(12) United States Patent
Lemieux

(10) Patent No.: US 8,674,526 B2
(45) Date of Patent: *Mar. 18, 2014

(54) ELECTRICAL ENERGY GENERATOR

(75) Inventor: Aaron Patrick Lemieux, Cleveland, OH (US)

(73) Assignee: Tremont Electric, Inc., Cleveland, OH (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/985,811

(22) Filed: Jan. 6, 2011

(65) Prior Publication Data

US 2011/0193428 A1  Aug. 11, 2011

Related U.S. Application Data

(60) Provisional application No. 61/292,837, filed on Jan. 6, 2010.

(51) Int. Cl.
*H02K 35/02* (2006.01)

(52) U.S. Cl.
USPC ............................................ 290/1 R; 310/25

(58) Field of Classification Search
None
See application file for complete search history.

(56) References Cited

U.S. PATENT DOCUMENTS

| | | | |
|---|---|---|---|
| 1,275,514 A | 8/1918 | Wolak | |
| 3,100,292 A | 8/1963 | Warner, Jr. et al. | |
| 3,103,603 A | 9/1963 | Reutter | |
| 3,129,347 A | 4/1964 | Tognola | |
| 3,463,946 A | 8/1969 | Zimmerman | |
| 3,465,161 A | 9/1969 | Cutkosky | |
| 3,483,759 A | 12/1969 | O'Sullivan, Jr. et al. | |
| 3,553,726 A | 1/1971 | Zimmerman | |
| 3,633,053 A | 1/1972 | Peters | |
| 3,746,937 A | 7/1973 | Koike | |
| 3,963,948 A | 6/1976 | Bratkowski et al. | |
| 3,980,908 A | 9/1976 | McClintock | |
| 3,984,707 A | 10/1976 | McClintock | |
| 4,158,811 A | 6/1979 | Li et al. | |
| 4,220,907 A | 9/1980 | Pappas | |
| 4,249,096 A | 2/1981 | Hickox | |
| 4,315,197 A | 2/1982 | Studer | |
| 4,342,920 A | 8/1982 | Bucknam | |
| 4,399,368 A | 8/1983 | Bucknam | |

(Continued)

FOREIGN PATENT DOCUMENTS

CN  276857 Y  3/2006
CN  1776290 A  5/2006

(Continued)

OTHER PUBLICATIONS

Office Action from the United States Patent and Trademark Office, mailing date Feb. 3, 2011 for U.S. Appl. No. 12/399,448.

(Continued)

*Primary Examiner* — Tulsidas C Patel
*Assistant Examiner* — Sean Gugger
(74) *Attorney, Agent, or Firm* — Curatolo Sidoti Co., LPA; Salvatore A. Sidoti

(57) ABSTRACT

An electrical energy generator including a housing, an electromagnetically active mass positioned within the housing, an electrically conductive material within the housing, a body positioned within the housing wherein the body and the electromagnetically active mass move relative to each other, and at least one spring for imparting restorative forces to the electromagnetically active mass and the body.

19 Claims, 1 Drawing Sheet

(56) References Cited

U.S. PATENT DOCUMENTS

| | | | |
|---|---|---|---|
| 4,454,426 A | 6/1984 | Benson | |
| 4,473,751 A | 9/1984 | Rombach et al. | |
| 4,484,082 A | 11/1984 | Bucknam | |
| 4,583,027 A | 4/1986 | Parker et al. | |
| 4,649,283 A | 3/1987 | Berchowitz et al. | |
| 4,754,644 A | 7/1988 | Valentini | |
| 4,924,123 A | 5/1990 | Hamajima | |
| 5,347,186 A | 9/1994 | Konotchick | |
| 5,434,549 A | 7/1995 | Hirabayashi et al. | |
| 5,503,314 A | 4/1996 | Fiscus | |
| 5,564,612 A | 10/1996 | Gregory | |
| 5,578,877 A | 11/1996 | Tieman | |
| 5,723,789 A | 3/1998 | Shannon | |
| 5,762,243 A | 6/1998 | Gleason | |
| 5,762,251 A | 6/1998 | McMaster et al. | |
| 5,818,132 A | 10/1998 | Konotchick | |
| 5,904,282 A | 5/1999 | Gleason | |
| 5,965,964 A | 10/1999 | Skinner et al. | |
| 5,975,714 A * | 11/1999 | Vetorino et al. | 362/192 |
| 6,142,395 A | 11/2000 | Reiter | |
| 6,170,767 B1 | 1/2001 | Herold et al. | |
| 6,218,921 B1 | 4/2001 | Eberts et al. | |
| 6,236,123 B1 | 5/2001 | Pinkerton | |
| 6,619,523 B1 | 9/2003 | Duckworth | |
| 6,637,631 B2 | 10/2003 | Lafoux et al. | |
| 6,705,085 B1 | 3/2004 | Braithwaite et al. | |
| 6,770,988 B2 | 8/2004 | Denne | |
| 6,809,427 B2 | 10/2004 | Duncan et al. | |
| 6,809,434 B1 | 10/2004 | Cheung et al. | |
| 6,812,583 B2 | 11/2004 | McGill et al. | |
| 6,812,597 B2 | 11/2004 | Cheung et al. | |
| 6,815,847 B2 | 11/2004 | Duncan et al. | |
| 6,853,103 B2 | 2/2005 | Moriyasu | |
| 6,864,647 B2 | 3/2005 | Duncan et al. | |
| 6,873,067 B2 | 3/2005 | Ichii et al. | |
| 6,914,351 B2 | 7/2005 | Chertok | |
| 6,936,937 B2 | 8/2005 | Tu et al. | |
| 6,952,060 B2 | 10/2005 | Goldner et al. | |
| 6,958,553 B2 * | 10/2005 | Ichii et al. | 310/15 |
| 6,982,497 B2 | 1/2006 | Rome | |
| 7,015,613 B2 | 3/2006 | Lilie et al. | |
| 7,064,461 B2 | 6/2006 | Razzaghi | |
| 7,124,720 B2 | 10/2006 | Liang et al. | |
| 7,132,597 B2 | 11/2006 | Hosler | |
| 7,148,583 B1 | 12/2006 | Shau et al. | |
| 7,249,579 B2 | 7/2007 | Liang et al. | |
| 7,285,878 B2 | 10/2007 | McGill et al. | |
| 7,288,860 B2 | 10/2007 | Cheung et al. | |
| 7,345,372 B2 | 3/2008 | Roberts et al. | |
| 7,439,641 B2 | 10/2008 | Ogino et al. | |
| 7,474,018 B2 | 1/2009 | Shimizu et al. | |
| 7,498,682 B2 | 3/2009 | Lemieux | |
| 7,692,320 B2 | 4/2010 | Lemieux | |
| 7,712,174 B2 | 5/2010 | Shimizu et al. | |
| 2003/0155771 A1 | 8/2003 | Cheung et al. | |
| 2004/0100100 A1 | 5/2004 | Wilson | |
| 2004/0104625 A1 | 6/2004 | Wakuda et al. | |
| 2004/0150277 A1 | 8/2004 | Moriyasu | |
| 2004/0155467 A1 | 8/2004 | Cheung et al. | |
| 2004/0222637 A1 | 11/2004 | Bednyak | |
| 2004/0222638 A1 | 11/2004 | Bednyak | |
| 2004/0251748 A1 | 12/2004 | Inagaki et al. | |
| 2004/0251750 A1 | 12/2004 | Cheung et al. | |
| 2005/0211199 A1 | 9/2005 | Liang et al. | |
| 2005/0211200 A1 | 9/2005 | Liang et al. | |
| 2005/0279300 A1 | 12/2005 | Liang et al. | |
| 2006/0192386 A1 | 8/2006 | Rome | |
| 2007/0040457 A1 * | 2/2007 | Shimizu et al. | 310/15 |
| 2007/0131185 A1 | 6/2007 | Liang et al. | |
| 2007/0158946 A1 | 7/2007 | Annen et al. | |
| 2007/0158947 A1 | 7/2007 | Annen et al. | |
| 2007/0210580 A1 | 9/2007 | Roberts et al. | |
| 2008/0036303 A1 | 2/2008 | Stevens | |
| 2008/0074083 A1 | 3/2008 | Yarger et al. | |
| 2008/0174187 A1 | 7/2008 | Erixon et al. | |
| 2008/0217926 A1 | 9/2008 | Lemieux | |
| 2008/0284258 A1 | 11/2008 | Spratte et al. | |
| 2009/0051229 A1 | 2/2009 | Shau | |
| 2009/0058201 A1 | 3/2009 | Brennvall | |
| 2009/0121493 A1 | 5/2009 | Lemieux | |
| 2009/0121494 A1 | 5/2009 | Lemieux | |
| 2009/0146508 A1 | 6/2009 | Peng et al. | |
| 2009/0278358 A1 | 11/2009 | Lemieux | |
| 2009/0295253 A1 | 12/2009 | Yarger et al. | |
| 2009/0295520 A1 | 12/2009 | Yarger et al. | |

FOREIGN PATENT DOCUMENTS

| | | |
|---|---|---|
| CN | 2906123 Y | 5/2007 |
| JP | 7-9081 | 2/1995 |
| JP | 2002-374661 | 12/2002 |
| JP | 2006-166694 | 6/2006 |
| JP | 2005-94832 | 5/2007 |
| KR | 10-2006-0003092 | 1/2006 |
| KR | 10-2006-0009329 | 1/2006 |
| UA | 19437 U | 12/2006 |

OTHER PUBLICATIONS

Office Action from China Patent Office issued Mar. 15, 2011 for China Patent Application No. 20080015188X.

English language abstract and machine translation of JP 2005-94832; Publication Date: Apr. 7, 2005; Applicant: Sony Corp.

International Search Report and Written Opinion, for PCT International Patent Application No. PCT/US2011/020361 corresponding to U.S. Appl. No. 12/985,777.

International Search Report and Written Opinion, for PCT International Patent Application No. PCT/US2011/020363 corresponding to U.S. Appl. No. 12/985,811.

* cited by examiner

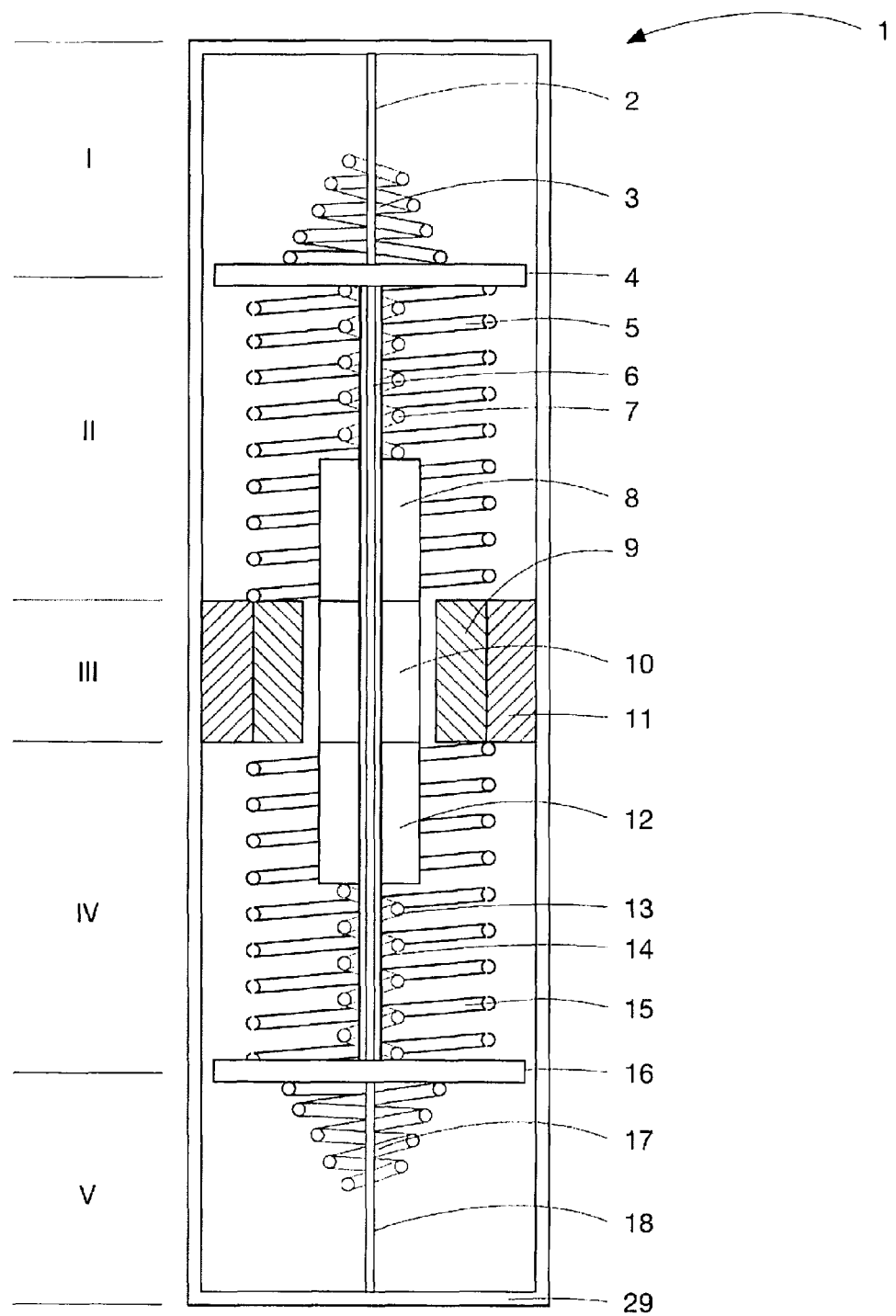

ELECTRICAL ENERGY GENERATOR

This application claims the benefit of the filing date, under 35 U.S.C. §119(e), of U.S. Provisional Application for Patent Ser. No. 61/292,837, filed on Jan. 6, 2010.

A device for harvesting mechanical energy from a moving mass and converting the harvested mechanical energy into usable electrical energy is disclosed. The device permits the capture of mechanical energy imparted to the device from movement and the conversion of the captured mechanical energy into electrical energy.

Mechanical energy comprises a number of forms of energy including, but not limited to kinetic energy. Mechanical energy is manifested in the bodies of humans and animals as a result of their physical processes. Such physical processes include voluntary body movements. Amongst voluntary body movements are gait processes. Gait activities include stepping, walking, running, climbing, jumping, and similar activities. Other voluntary body movements include grasping, reaching, shaking, swinging, stretching, etc. All voluntary body movements are manifested as motion of body members having mass so that all voluntary motor activities develop kinetic energy. Further, voluntary motor activities may impart kinetic energy to peripheral masses engaged with a moving body.

It is sometimes desirable to convert mechanical energy into electrical energy. An example is the conversion of kinetic energy into electrical energy as the kinetic energy of a mass moves a magnetic field relative to a conductive coil thereby converting the kinetic energy of the mass to electrical energy by action of electromagnetic induction.

Devices to convert the kinetic energy manifested in the bodies and peripheral masses engaged with the bodies of humans as a result of their physical processes into electrical energy are not well-developed. Accordingly, it is desirable to provide a device to harvest kinetic energy imparted by voluntary motor activities and convert the harvested mechanical energy into electrical energy.

Embodiments of the subject matter are disclosed with reference to the accompanying drawing and are for illustrative purposes only. The subject matter is not limited in its application to the details of construction or the arrangement of the components illustrated in the drawings.

FIG. 1 is a cross-sectional view of one illustrative embodiment of the electrical energy generator.

Kinetic energy is manifested in the bodies of animals and humans, as a result of different voluntary motor activities. Voluntary motor activities include, for example, gait processes, leg movements, arm movements, head movements, torso movements, and the like. Kinetic energy is also manifested in the objects or masses that are moved by a human or animal in the course of transporting them. Some voluntary motor activities, such as human walking gait, are rhythmic activities which have a predictable frequency or periodicity. In the case of human walking gait, the predictable frequency is approximately 2 Hz.

The disclosed device harvests mechanical energy and converts the harvested mechanical energy into electrical energy. By harvesting mechanical energy from the reciprocating electromagnetically active mass and converting it into electrical energy, the device acts as an electrical generator. The device thus harvests mechanical energy and outputs electrical energy. The electrical energy may be used for sensing a vibration or shock (impulse), for harvesting kinetic energy for recharging and operating devices autonomously, or for creating utility scale electrical power.

The generated electrical energy may be used to power a wide variety of electronic devices including, without limitation, locators, signaling equipment, entertainment equipment, energy storage equipment, radio receivers, radio transmitters, wireless telephones, cameras, global positioning system (GPS) equipment, and like electronic devices.

An electrical energy generator for harvesting kinetic energy and converting the harvested kinetic energy developed or imparted by voluntary motor activities into electrical energy is provided. The electrical energy generator generally comprises a housing, an electrically conductive material, an electromagnetically active mass movable in a reciprocating manner relative to the housing, and at least one spring positioned within the housing.

The electrical energy generator comprises a housing having a longitudinal axis, an electromagnetically active mass positioned within the housing reciprocally movable along at least a portion of the longitudinal axis, an electrically conductive material within the housing, a body positioned within the housing reciprocally movable along at least a portion of the longitudinal axis, wherein the body and the electromagnetically active mass move relative to each other, and at least one spring for imparting restorative forces to the electromagnetically active mass and the body.

According to certain illustrative embodiments, the electrical energy generator comprises a housing having a longitudinal axis and first and second opposing ends, an electromagnetically active mass positioned within the housing reciprocally movable along at least a portion of the longitudinal axis, an electrically conductive material within the housing and positioned about the electromagnetically active mass, a body comprising a shaft portion and first and second spring stop portions, the shaft portion being engaged with and between the first and second spring stop portions, a first spring positioned between the first spring stop portion and the electrically conductive material, a second spring positioned between the second spring stop portion and the electrically conductive material, a third spring engaged with the first spring stop portion and the electromagnetically active mass, and a fourth spring engaged with the second spring stop portion and the electromagnetically active mass.

According to additional illustrative embodiments, the electrical energy generator comprises a housing having a longitudinal axis and first and second opposing ends, an electromagnetically active mass positioned within the housing reciprocally movable along at least a portion of the longitudinal axis, an electrically conductive material within the housing and positioned about the electromagnetically active mass, a body comprising a shaft portion and first and second spring stop portions, the shaft portion being engaged with and between the first and second spring stop portions, a first spring positioned between the first spring stop portion and the electrically conductive material, a second spring positioned between the second spring stop portion and the electrically conductive material, a third spring engaged with the first spring stop portion and the electromagnetically active mass, a fourth spring engaged with the second spring stop portion and the electromagnetically active mass, a fifth spring positioned between the first end of the housing and the first spring stop portion, and a sixth spring positioned between the second end of the housing and the second spring stop portion.

At least one of the springs positioned between the spring stops and the ends of the housing may have a nonlinear spring coefficient. At least one of the first through sixth springs may comprise a coil spring. At least one of the first through fourth springs may comprise a compression spring. At least one of the first through fourth springs may comprise an extension spring. At least one of the third and fourth springs may comprise a pre-compressed spring.

A guide rod may be included to constrain the movement of the electromagnetically active mass to minimize or substantially prevent non-reciprocating motion of the electromagnetically active mass within the housing.

The electrical energy generator may additionally comprise at least one means for adjusting the deflection of at least one of the springs of the device.

The electrical energy generated by the device may be low frequency AC power. When low frequency AC power is generated by the device, rectification is utilized to convert the AC power into usable DC power. An inductor or transformer may also be used on the output prior to rectification.

An energy storage device may be used after rectification of the generated electrical power. Any suitable energy storage device may be used in the device, such as, without limitation, one or more capacitors or batteries. The energy storage device may be used to store the energy converted by the circuit for storage or for transfer to another device.

The device may further include a power conditioning circuit. Without limitation, and only by way of illustration, suitable power conditioning units may include linear regulators, AC-DC systems, AC-DC-AC systems, switch mode power supplies (SMPS), and the like.

The housing of the device may comprise any suitable structure, capsule, container, or vessel that is capable of engaging the other components of the electrical energy generator. Without limitation, according to certain embodiments, the housing comprises an elongated cylinder or tube having an interior cavity or volume.

The housing may be constructed of any material that can support the engagement of device components and that does not interfere with the harvest of mechanical energy or conversion of the mechanical energy into electrical energy. Without limitation, suitable material that may be used to construct the housing of the device comprises metal, metal alloys, plastic, glass, composite materials, or combinations thereof.

The housing may be provided as an open container, such that the interior of the housing is in communication with the external environment surrounding the housing. According to embodiments in which the housing is open, the means of communication with the environment surrounding the housing may include apertures, holes, vents, slots, perforations, or like structure(s) located within the wall of the housing, thereby providing communication between the interior cavity of the housing and the external environment. In open embodiments, the housing atmosphere is generally substantially identical to the surrounding environmental atmosphere.

According to other embodiments, the housing comprises a closed structure such that the interior of the housing is substantially isolated from the environment surrounding the housing. According to embodiments including a closed housing, the housing atmosphere need not be substantially identical to the surrounding external environmental atmosphere. For example, without limitation, the housing atmosphere may comprise air, nitrogen, a Nobel gas, mineral oil, vegetable oil, water, saline, partial vacuum, substantial vacuum, a ferrofluid, or combinations thereof.

The electrical energy generator comprises an electromagnetically active mass. As used herein, "electromagnetically active" refers to a mass that is capable of affecting a magnetic field. Electromagnetically active components include, but are not limited to, permanent magnets, electromagnets, inductors, and materials having magnetic permeability. The electrical energy generator may comprise one or more electromagnetically active components to affect a desired magnetic field.

An electromagnetically active mass may be any electromagnetically active component which also has mass. An electromagnetically active mass may comprise a composite mass comprising electromagnetically active portions and electromagnetically inactive portions. An electromagnetically active mass is capable of producing a magnetic field or bending the flux lines of a magnetic field. Electromagnetically active masses capable of producing a magnetic field comprise permanent magnets, electromagnets and the like. Electromagnetically active masses capable of bending the flux lines of a magnetic field may also comprise materials having magnetic permeability. In certain embodiments, the materials having magnetic permeability are materials which have a high permeability. Without limitation, materials which have a high permeability comprise iron, nickel, chromium, and like materials. In certain embodiments, an electromagnetically active mass may comprise metal, metal alloys, ceramics, and mixtures thereof.

The electromagnetically active mass is positioned within the housing. The manner of positioning within the housing of the electromagnetically active mass and the various springs allows the electromagnetically active mass to move in a reciprocating manner with respect to the housing. The electromagnetically active mass defines a volume which is swept out by the electromagnetically active mass as it moves. The volume which is swept out by the electromagnetically active mass as it moves is at least a portion of the volume of the interior cavity of the housing.

The shape of the electromagnetically active mass can vary greatly, and there is no particular shape to which the electromagnetically active mass must be limited. In certain embodiments, the electromagnetically active mass comprises an axisymmetric shape. In certain embodiments, the electromagnetically active mass comprises a substantially cylindrical shape.

In certain embodiments, the guide rod acts as a guidance means for the body, while the body acts as a guidance means for the electromagnetically active mass. In certain embodiments the guidance surface of either of the guidance means comprises a surface coating. The surface coating may comprise metal, plastic, glass, composite materials, or combinations thereof. In certain embodiments the guidance means, or the guidance surface of the guidance means, may comprise PTFE, PEEK, or oil-impregnated bronze. The guidance surface of the guidance means may substantially coincide with at least a portion of the surface of the volume swept out by the body and/or the electromagnetically active mass as either or both move. According to certain embodiments, the guidance means guides the body and/or the mass by providing restorative forces to the body and/or the mass in directions substantially normal to the surface of the means in response to contact between the body and/or the mass and the means. These restorative forces are referred to as "normal forces". By providing such restorative forces, the guidance means impedes motion of the body and/or the mass in directions normal to the means. In certain embodiments, the body and/or the mass may be engaged with the guidance means during all portions of the motion of the body and/or the mass. In certain embodiments, the body and/or the mass is constrained by the guidance means to minimize substantially all motion of the body and/or the mass other than linear reciprocation, such that motion of the body and/or the mass is limited to substantially linear reciprocation. There will exist a coefficient of friction determined by the material of the guidance surface and the material of the body and/or the mass which contacts the material(s) of the guidance surface. The product of the coefficient of friction and the normal forces defines the magnitude of friction forces between the body and/or the mass and the means which retard the motion of the body and/or the mass. In certain embodiments, the coefficient of friction is selected to be very low in order to minimize the magnitude of friction forces.

The device includes an electrically conductive material within the housing and positioned about the electromagnetically active mass. The electrically conductive material may comprise one or more electrically conductive components which may be adjacent to each other or may be spaced apart in the longitudinal direction of the housing. Without limitation, the electrically conductive material may be provided in the form of one or more induction coils. The induction coil(s) may include an armature, inductor, wire coil, or any other looped electrically conductive material. A change in a local magnetic field produces a current within and a potential across an induction coil. Because the induction coil is positioned about the electro-magnetically active mass, a change in position of the electromagnetically active mass within a magnetic field of the induction coil produces a current within and a potential across the induction coil.

The electrical energy generator includes a body which includes a shaft portion and spring stop portions. Without limitation, the shaft portion my be substantially cylindrical, and may comprise a through hole in order to engage the guide rod. The shaft portion is reciprocally movable within the housing, and acts as a guidance means for the electromagnetically active mass, which is reciprocally movable relative to the body. Without limitation, at least a portion of the shaft portion of the body may comprise an electromagnetically active material as described herein. Without limitation, the shaft portion may be integral with the spring stop portions of the support structure.

The spring stop portions of the support structure may be of any size and shape suitable to engage any of the springs which may be present in the generator. Without limitation, the spring stop portions may be adapted to constrain the movement of the electromagnetically active mass to minimize or substantially prevent non-reciprocating motion of the electromagnetically active mass within the housing. Without limitation, the spring stop portions may be adapted to minimize motion retardation during movement of the electromagnetically active mass and the body within the housing. The spring stop portions of the body may be adapted to rotate relative to the body as the at least one spring experiences compression or extension.

The spring stop portion also provides additional movable mass to the electrical energy generator. Increasing the total movable mass within the electrical energy generator has been shown to increase the effectiveness of the electrical energy generator due to the increased momentum provided by the increased total movable mass within the housing.

The device includes various springs positioned within the housing. As used herein, a "spring" is any component which produces a restorative force in response to its displacement. Certain springs produce restorative forces directly proportional to their displacement. Springs which produce restorative forces directly proportional to their displacement are springs which obey Hooke's Law. A spring accumulates mechanical energy in the form of potential energy as work is done upon it and releases it as the above-referenced restorative force. The relationship between the restorative force and the displacement is characterized by a spring coefficient. In springs which obey Hooke's Law, the spring coefficient is substantially constant throughout displacement of the spring.

Certain other springs produce restorative forces which are not directly proportional to their displacement, referred to herein as springs with nonlinear spring coefficients. These springs do not obey Hooke's law, and can be utilized to provide differential forces with respect to their displacement in order to provide greater or lesser restorative forces.

When the electrical energy generator comprises at least two springs and the springs substantially obey Hooke's Law, the spring/mass system is considered to be a harmonic oscillator and can provide a natural frequency. In certain circumstances, however, it may be advantageous to utilize springs that possess stiffening spring characteristics such that at the end of travel, there would be no need to incorporate any rebound means with the device.

The various springs that are included in the device may include extension springs, compression springs, Bellville springs, elastic material, or any combination of these different types of springs. In certain embodiments, the spring(s) included in the electrical energy generator comprise coil springs. A coil spring is a type of torsion spring. A coil spring comprises an elastic material formed into a helix, or spiral, or spiral helix having two opposite ends. The coil springs may comprise either compression springs or extension springs.

A spring pre-load is a load that exists in the spring prior to deflection of the spring from some initial state. As used herein, pre-load of a spring refers to the load in the spring in the unexcited device in which the electromagnetically active mass is at rest. The device may also include a suitable means for adjusting the deflection or spring pre-load on the coil springs. A means of adjusting spring pre-load comprises any component which introduces or removes a load, tension or compression of an installed spring, usually in the unexcited device. Introduction or removal of a load of an installed spring may be done by adjusting the deflection of the spring. In certain embodiments the means of adjusting a spring's pre-load and deflection comprises a movable member to which the spring is engaged. In such embodiments, the region of engagement between the spring and the member is movable with respect to the housing. In certain embodiments, the moveable member comprises a threaded member. Threaded members may comprise screws, bolts, or threaded bushings. In certain embodiments the threaded member is engaged with a counterpart threaded receiver that is substantially fixed to or integral to the housing. One illustrative method of moving the point of engagement between the spring and the threaded member with respect to the housing is by advancement or retraction of the threaded member by rotating the threaded member with respect to the threaded receiver. As the threaded member is rotated, the threaded member and the region of engagement between the spring and the member moves helically with respect to the threaded receiver, and thereby moves helically with respect to the housing. The amount of movement will be equal to the product of the thread pitch and the number of rotations made. The amount of change in the load will be equal to the product of the amount of movement and the spring coefficient.

In certain embodiments, at least one of the springs may be pre-compressed, meaning that the spring(s) will be positioned within the housing such that, when the housing is at rest and the electromagnetically active mass is substantially still, the spring(s) will be in a state of compression. This pre-compression will reduce losses in the forces associated with the electromagnetically active mass when the mass is in motion. In a preferred embodiment, the third and fourth springs are pre-compressed.

The electrical energy generator may further comprise a means of mitigating motion retardation of the electromagnetically active mass by the housing atmosphere. The housing atmosphere may comprise a fluid, wherein such fluid may be a gas or a liquid. Fluids are known to retard the motion of materials passing through them. In certain circumstances, the housing atmosphere will retard the motion of the electromagnetically active mass through the housing atmosphere.

One type of retardation of the motion of the electromagnetically active mass is by viscous effects. Viscous effects which retard motion appear whenever a body moves through a fluid having a positive viscosity. One means of mitigating motion retardation by viscous effects is by rarification or evacuation of the housing atmosphere. In certain embodiments, the housing atmosphere comprises a gas at sub-atmospheric pressure, such that the housing atmosphere is reduced, rarified, or evacuated to the point that it comprises a partial or substantial vacuum.

Retardation of the motion of the electromagnetically active mass may occur by pressure differentials. Pressure differentials may be created by motion of an object within, and in close clearance to, a closed housing or other structure within the housing. In certain embodiments, the electromagnetically active mass may be engaged in very close tolerance to an electrically conductive material. One means of mitigating motion retardation by pressure differentials is by the inclusion of apertures, flow-paths, flutes, or ducts to permit flow from the region into which the mass is moving and to the region from which the mass is moving. In certain embodiments, the interior surface of the electrically conductive material or any guidance means which may be utilized may comprise longitudinal flutes to permit flow of the fluid comprising the housing atmosphere from one region of the interior cavity to another region of the interior cavity. In certain embodiments the electromagnetically active mass may comprise one or more through-holes or flutes which permit flow of the fluid comprising the housing atmosphere around, across, or through the mass.

According to certain embodiments, the electrical energy generator may further comprise an electromagnetically active shroud that is engaged with the housing and at least partially covering the electrically conductive material. In certain embodiments, the electrical energy generator comprises an electromagnetically active shroud that is engaged with the housing which at least partially covers the housing and/or the electrically conductive material. In certain embodiments the electrical energy generator may comprise an electromagnetically active shroud that is engaged with the housing which fully covers said housing. In certain embodiments the electromagnetically active shroud may comprise a permanent magnet. In certain embodiments, the electromagnetically active shroud comprises an unmagnetized material having magnetic permeability. In embodiments in which the electromagnetically active mass comprises an unmagnetized material having magnetic permeability, the device will further comprise an electromagnetically active shroud which comprises a permanent magnet. In certain embodiments in which the electromagnetically active mass comprises a permanent magnet, the device comprises an electromagnetically active shroud comprising an unmagnetized material having magnetic permeability.

The electrical energy generator comprises an electromagnetically active mass and a body which reciprocate relative to each other within the housing. Exciting forces acting on the housing excite the mass and/or the body causing the mass and/or the body to move within the housing in a reciprocating manner. Further, the electrical energy generator comprises components which remove mechanical energy from the mass when it is in motion, thereby electromagnetically damping it. Because of these properties, certain embodiments of the electrical energy generator may be described as a substantially harmonic damped oscillator. It should be noted that the damping of the energy from the mass may comprise critically damping, greater than critically damping or less than critically damping. According to certain illustrative embodiments, the damping of the energy from the mass comprises less than critical damping. According to yet further embodiments, the damping of the energy of the mass may be variable.

When a driving force is acting on the electrical energy generator, according to certain embodiments, the device behaves as a substantially harmonic driven, damped oscillator. Harmonic oscillators have a fundamental or natural frequency which is a function of oscillating mass and spring coefficient. Because the mass of the electromagnetically active mass and of the body are determinable and because the spring coefficient of the various springs are determinable, the natural frequency of the device is also determinable. The selection of the mass of the mass and/or the body or spring coefficient or any combination of these to adjust the natural frequency of the device is referred to herein as "tuning". That is, the natural frequency of the device may be tuned by selection of the mass of the mass and/or the body or the spring coefficient or any combination of these.

Because the mass and the body have inertia, an exciting force directed to the device along a direction which is not perpendicular to the axis of reciprocation causes the housing to be displaced to a greater extent than the mass and/or the body are caused to be displaced. This difference in displacement causes some of the exciting kinetic energy imparted by the action of the exciting force acting over said displacement to be absorbed by the electromagnetically active mass, the body, the various springs and the electrically conductive material.

Because the electrical energy generator includes an electromagnetically active mass, a body, a spring, and an electrically conductive material, when set into motion, the device can behave as a damped vibrating system and will vibrate until it dissipates the exciting energy. The natural frequency or frequencies of the generator can be predetermined. Without limitation, in certain embodiments, the electrical energy generator behaves as a substantially harmonic oscillator having one natural frequency. The level of damping in the device can be predetermined.

Because the body and the electromagnetically active mass reciprocate relative to one another when the device is excited by outside forces, the forcing frequency of the interaction between the electromagnetically active mass and the electrically conductive material is doubled. This occurs because the system has two degrees of freedom, namely because the variables associated with the mass of the electromagnetically active mass and the body are independent of each other.

For example, if the frequency experienced by the device when excited is 2 Hz, the body/electromagnetically active mass system will experience a frequency of 4 Hz, and the electromagnetically active mass will independently experience a frequency of 4 Hz, which provides a frequency of 8 Hz with respect to the interaction of the electromagnetically active mass with the electrically conductive material.

The certain illustrative embodiments of the device will be described in further detail with respect to FIG. 1. The electrical energy generator should not be limited to the illustrative embodiments depicted by FIG. 1, as the generator may take many forms as described above.

As shown in FIG. 1, the device 1, shown at a state of rest, comprises a housing 29 which comprises an elongated circular cross-section tube having first and second ends. The housing 29 comprises an internal cavity defined by the tube and is divided into regions I, II, III, IV, and V. The device 1 further comprises an electromagnetically active mass 8, 10, 12 which is engaged with a body having a shaft portion 6, 14 and two spring stop portions 4, 16, the shaft portion 6, 14 being supported by a guide rod 2, 18 with which the body is movably engaged. The electromagnetically active mass 8, 10, 12 moves in a reciprocating manner along a path constrained by the shaft portion 6, 14 and an induction coil 9, 11 which is positioned about the electromagnetically active mass 8, 10, 12. The device further comprises a first spring 5 having a first end and a second end. First spring 5 comprises a coil spring having the first end engaged with the induction coil 9, 11 and the second end engaged with the spring stop 4. The device further comprises a second spring 15 having a first end and a second end. Second spring 15 comprises a coil spring having the first end engaged with induction coil 9, 11 and the second end engaged with the spring stop 16. The device further comprises third and fourth springs 7, 13, which are precompressed and fixedly engaged with the spring stops 4, 16 and which will periodically come into contact with the electromagnetically active mass 8, 10, 12. The device further comprises fifth and sixth springs 3, 17 having nonlinear spring coefficients, which are engaged with the spring stops 4, 16, positioned so that, when the device experiences a driving force, the fifth and sixth springs 3, 17 will periodically come into contact with the housing 29.

The device further comprises a guide rod 2, 18, which passes longitudinally through the center of the spring stops 4, 16, shaft portion 6, 14 and electromagnetically active mass 8, 10, 12. Independent movement of the electromagnetically active mass 8, 10, 12 and the support structure relative to the housing 29 causes motion of the various springs 3, 5, 7, 13, 15, 17 such that the motion of the electromagnetically active mass 8, 10, 12 and support structure relative to the induction coil 9, 11 results in deflection of the various springs 3, 5, 7, 13, 15, 17.

As depicted in FIG. 1, the electromagnetically active mass 8, 10, 12 comprises three portions. In certain embodiments, the portions may independently be either electromagnetically active or electromagnetically inactive. For example, all three portions may be electromagnetically active, or portions 8 and 12 may be electromagnetically active while portion 10 is electromagnetically inactive. In a preferred embodiment, portion 10 is electromagnetically active while portions 8, 12 are electromagnetically inactive.

In certain embodiments the mechanical energy harvester is engaged with a worn item or a carried item. Worn items comprise clothing, such as a hat, belt, shirt, pants, dress, skirt, sweater, sweatshirt, jacket and the like. Protective gear, includes without limitation body armor, life vest, personal flotation devices and the like. Carrying items include without limitation backpacks, waist-packs, field-packs, medical packs, bags, tool-bags, book-bags, purses, briefcases, holsters, sheaths and the like.

In embodiments in which the electrical energy generator is engaged with a worn item, the worn item is excited by exciting forces imparted from the wearer, and the electrical energy generator is excited by exciting forces imparted from the worn item. The engagement of the electrical energy generator with the worn item may be firm such that the device is substantially immobile relative to the worn carrying device; flexible or soft such that there is a great deal motion of the device relative to the worn item; or somewhere in between.

Without limitation, an electrical energy generator may be a designed for hand-held usage such that the device harvester can be excited by shaking it by hand.

If there is a known frequency source the device may be tuned to resonate at this frequency thereby increasing the amount of mechanical energy in the system resulting in an increase in the output of electrical energy from the device. For purposes of illustration and without limitation, a common excitation frequency for walking is about 2 Hz. This information may be used to predetermine an appropriate natural frequency of the electrical energy generator. Depending upon the embodiment and desired operational characteristics, it may be desirable to have one or more of the natural frequencies of the device similar to one or more of the operational frequencies of the source of the excitation kinetic energy; or dissimilar to one or more of the expected operational frequencies of the source of the excitation kinetic energy by some predetermined amount.

In certain embodiments, one natural frequency of the device is predetermined to correspond to the steady state harmonic motion of the gait of the human or animal by which it is carried or worn.

While the electrical energy generator has been described in connection with various illustrative embodiments, as shown in the Figure, it is to be understood that other similar embodiments may be used or modifications and additions may be made to the described embodiments for performing the same functions. Therefore, the electrical energy generator should not be limited to any single embodiment, but rather construed in breadth and scope in accordance with the recitation of the appended claims.

I claim:

1. An electrical energy generator comprising:
   a housing having a longitudinal axis and first and second opposing ends;
   an electromagnetically active mass positioned within the housing reciprocally movable along at least a portion of the longitudinal axis;
   an electrically conductive material within the housing;
   a body positioned within the housing reciprocally movable along at least a portion of the longitudinal axis, wherein the body and the electromagnetically active mass move relative to each other, the body comprising a shaft portion and first and second spring stop portions, the shaft portion being engaged with and between the first and second spring stop portions;
   a first spring positioned between the first spring stop portion and the electrically conductive material;
   a second spring positioned between the second spring stop portion and the electrically conductive material;
   a third spring engaged with the first spring stop portion and the electromagnetically active mass; and
   a fourth spring engaged with the second spring stop portion and the electromagnetically active mass.

2. The electrical energy generator of claim 1, further comprising:
   a fifth spring positioned between the first end of the housing and the first spring stop portion; and
   a sixth spring positioned between the second end of the housing and the second spring stop portion.

3. The electrical energy generator of claim 2, wherein at least one of the fifth and sixth springs has a nonlinear spring coefficient.

4. The electrical energy generator of claim 3, wherein at least one of the first and second springs has a nonlinear spring coefficient.

5. The electrical energy generator of claim 1, further comprising a guide rod extending along the longitudinal axis of the housing and fixed to the opposite ends of the housing.

6. The electrical energy generator of claim 5, wherein the guide rod passes through the shaft portion of the structure and the electromagnetically active mass.

7. The electrical energy generator of claim 1, wherein the housing comprises a cylinder or tube.

8. The electrical energy generator of claim 1, wherein the electrically conductive material comprises at least one induction coil.

9. The electrical energy generator of claim 1, wherein at least one of the springs of the generator comprises a coil spring.

10. The electrical energy generator of claim 9, wherein at least one of the springs of the generator comprises a compression spring.

11. The electrical energy generator of claim 9, wherein at least one of the springs of the generator comprises an extension spring.

12. The electrical energy generator of claim 9, wherein at least one of the springs of the generator comprises a pre-compressed spring.

13. The electrical energy generator of claim 12, wherein at least one of the first, second, fifth and sixth springs comprises a pre-compressed spring.

14. The electrical energy generator of claim 1, wherein the electromagnetically active mass comprises at least one permanent magnet.

15. The electrical energy generator of claim 14, wherein the electromagnetically active mass comprises at least one electromagnetically active mass portion and at least one electromagnetically inactive mass portion.

16. The electrical energy generator of claim 1, wherein the shaft portion is adapted to constrain the movement of the electromagnetically active mass to minimize or substantially prevent non-reciprocating motion of the electromagnetically active mass within the housing.

17. The electrical energy generator of claim 1, wherein the interior of the housing is in communication with the surrounding environment by means of at least one of apertures, holes, vents, slots, or perforations located within the housing.

18. The electrical energy generator of claim 1, wherein the housing comprises a closed structure and an atmosphere within the housing comprises at least one of air, nitrogen, a Nobel gas, mineral oil, vegetable oil, water, saline, partial vacuum, substantial vacuum, a ferrofluid, or combinations thereof.

19. The electrical energy generator of claim 1, further comprising at least one means for adjusting the deflection of at least one of the springs of the generator.

* * * * *